(12) United States Patent
Piasecki et al.

(10) Patent No.: US 11,611,304 B1
(45) Date of Patent: Mar. 21, 2023

(54) SYSTEM AND METHOD FOR MINIMIZING DEMAGNETIZATION IN ROTOR MAGNETS

(71) Applicant: GM GLOBAL TECHNOLOGY OPERATIONS LLC, Detroit, MI (US)

(72) Inventors: Jeffrey S. Piasecki, Rochester, MI (US); Brian A. Welchko, Oakland Township, MI (US); Anno Yoo, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/685,884

(22) Filed: Mar. 3, 2022

(51) Int. Cl.
*H02P 21/00* (2016.01)
*H02P 21/22* (2016.01)
*B60L 50/00* (2019.01)

(52) U.S. Cl.
CPC .............. *H02P 21/22* (2016.02); *B60L 50/00* (2019.02); *H02P 2207/05* (2013.01)

(58) Field of Classification Search
CPC ....................................... H02P 21/22
USPC ...................................... 318/400.02
See application file for complete search history.

(56) References Cited

U.S. PATENT DOCUMENTS

| | | | |
|---|---|---|---|
| 2008/0036415 A1* | 2/2008 | Kaizuka | H02P 21/0003 318/730 |
| 2012/0169267 A1* | 7/2012 | Nashiki | H02K 19/103 310/46 |
| 2016/0285327 A1* | 9/2016 | Sasaki | H02K 21/12 |

* cited by examiner

*Primary Examiner* — Erick D Glass
(74) *Attorney, Agent, or Firm* — Quinn IP Law

(57) ABSTRACT

A propulsion system for a device includes an electric motor configured to generate torque to propel the device. The electric motor includes a stator and a rotor with one or more permanent magnets. A controller is in communication with the electric motor and has recorded instructions for a method for minimizing demagnetization in the one or more permanent magnets. The controller is adapted to select a starting point and an intermediate point on a current trajectory in a stator current graph. The controller is adapted to obtain a final point on the stator current trajectory based on a comparison of the intermediate point and a predetermined voltage limit. A demagnetized torque capability is generated based on the final point on the current trajectory.

20 Claims, 3 Drawing Sheets

SYSTEM AND METHOD FOR MINIMIZING DEMAGNETIZATION IN ROTOR MAGNETS

INTRODUCTION

The disclosure relates generally to a propulsion system for a device having an electric motor. More specifically, the disclosure relates to a system and method for minimizing demagnetization in the rotor magnets of the electric motor. The use of purely electric vehicles and hybrid vehicles, such as battery electric vehicles, window extended electric vehicles, hybrid electric vehicles, plug-in hybrid electric vehicles and fuel cell hybrid electric vehicles, has greatly increased over the last few years. Propulsion for the hybrid electric vehicles and other electric-powered transportation devices may be provided by electric motors. Many electric motors include permanent magnets which may demagnetize over time, affecting the performance of the electric motor. The demagnetization may be due to various reasons such as temperature, age and/or specific events. In many electric-powered transportation devices, it is challenging to minimize demagnetization while continuing to meet torque demands.

SUMMARY

Disclosed herein is a propulsion system for a device having an electric motor. The electric motor is configured to selectively provide a torque contribution to propel the device and includes a stator and a rotor with one or more permanent magnets. A controller is in communication with the electric motor and has a processor and tangible, non-transitory memory on which instructions are recorded for a method for minimizing demagnetization in the one or more permanent magnets.

The controller is adapted to determine a demagnetization line in a stator current graph representing a threshold d-axis stator current, based in part on at least one variable motor parameter. A starting point is selected on a stator current trajectory in the stator current graph. The controller is adapted to obtain an intermediate point on the stator current trajectory by moving from the starting point along a desired torque curve until the demagnetization line is reached. The controller is adapted to obtain a final point on the stator current trajectory based on a comparison of the intermediate point and a predetermined voltage limit. A demagnetized torque capability is generated based on the final point on the current trajectory.

The starting point is selected such that it intersects a voltage limit ellipse representing the predetermined voltage limit, a global current limit and the desired torque curve. The desired torque curve is based in part on torque demand received by the controller and a maximum torque output per unit current for the electric motor. The controller is adapted to select the intermediate point as the final point on the current trajectory, when the intermediate point is at or within the predetermined voltage limit. When the intermediate point voltage limit is outside the predetermined voltage limit, the controller is adapted to determine the final point on the current trajectory by moving from the intermediate point along the demagnetization line until the predetermined voltage limit is met.

The controller is adapted to control at least one operating parameter of the device based in part on the demagnetized torque capability. The propulsion system may include a secondary source configured to selectively provide a secondary torque contribution to propel the device. Based on a magnitude of the demagnetized torque capability, controlling the operating parameter of the device includes adjusting the secondary torque contribution relative to the torque contribution.

The propulsion system may include at least one sensor configured to obtain a motor signal related to the electric motor, with the demagnetization line being based on the motor signal. In one embodiment, the motor signal is the rotor temperature and the at least one sensor is a rotor temperature sensor. In another embodiment, the motor signal is a current ripple and the at least one sensor is a current sensor. The propulsion system may include a direct current (DC) power source configured to provide a DC link voltage ($V_{dc}$) to the electric motor, with the predetermined voltage limit being based in part on the DC link voltage and a predetermined constant.

Disclosed herein is a method of operating a propulsion system in a device, the propulsion system having an electric motor with a stator and a rotor with one or more permanent magnets, and a controller having a processor and tangible, non-transitory memory. The method includes determining a demagnetization line on a stator current graph representing a threshold d-axis stator current, based in part on at least one variable motor parameter. A starting point is selected on a stator current trajectory in the stator current graph. The method includes obtaining an intermediate point on the stator current trajectory by moving from the starting point along a desired torque curve until the demagnetization line is reached. A final point on the stator current trajectory is obtained based on a comparison of the intermediate point and a predetermined voltage limit. The method includes generating a demagnetized torque capability based on the final point on the stator current trajectory.

The above features and advantages and other features and advantages of the present disclosure are readily apparent from the following detailed description of the best modes for carrying out the disclosure when taken in connection with the accompanying drawings.

Figure 1:
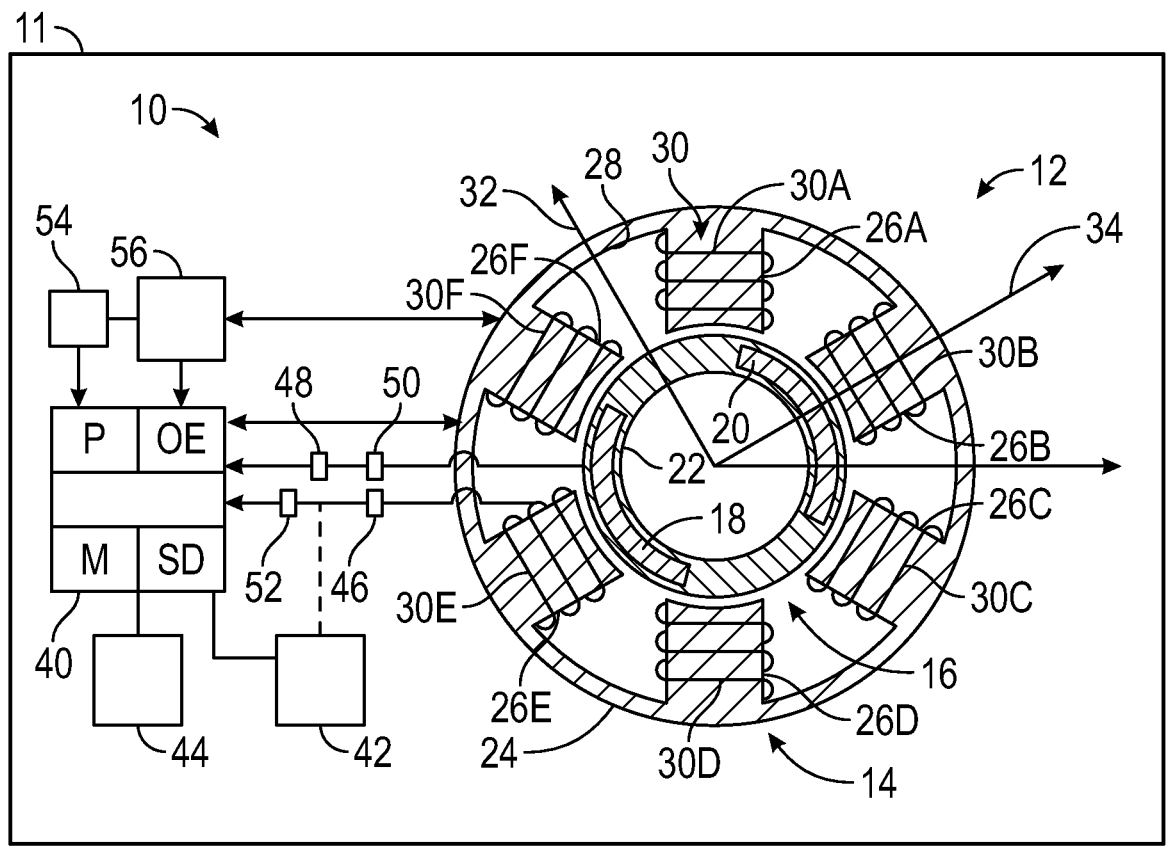
FIG. 1 is a schematic fragmentary partly sectional view of a propulsion system for a device having an electric motor and a controller.

Representative embodiments of this disclosure are shown by way of non- limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a propulsion system 10 for a device 11. The device 11 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other device. The device 11 may take many different forms and include multiple and/or alternate components and facilities.

Referring to FIG. 1, the device 11 includes an electric motor 12 having a stator 14, and a rotor 16 which includes at least one permanent magnet. The rotor 16 may include a first permanent magnet 18 and a second permanent magnet 20 of alternating polarity around the outer periphery of a rotor core 22. The rotor 16 may include as many permanent magnets as required per the application; for simplicity two are shown. The rotor 16 defines a rotor electrical speed ($\omega e$) and a rotor mechanical frequency ($\omega m$), which are related as ($\omega e = (P/2)*\omega m$), where P is the number of pole pairs. While the embodiment shown in FIG. 1 illustrates a three-phase, single pole pair (i.e. two poles) machine, it is understood that the number of phases or pole pairs may be varied.

Referring to FIG. 1, the stator 14 includes a stator core 24 which may be cylindrically shaped with a hollow interior. The stator core 24 may include a plurality of inwardly protruding stator teeth 26A-F, separated by gaps or slots 28. In the embodiment shown in FIG. 1, stator windings 30 may be operatively connected to the stator core 24, such as for example, being coiled around the stator teeth 26A-F. The electric motor 12 may include, but is not limited to, synchronous machines. While an example electric motor 12 is shown, the components illustrated in the FIG. are not intended to be limiting. Indeed, additional or alternative components and/or implementations may be used.

The stator 14 is configured to have electric current, referred to herein as stator current, flowing in the stator windings 30 and causing a rotating magnetic field in the stator 14. Referring to FIG. 1, the stator windings 30 may include six sets of windings; one set for each of three phases (the first phase through stator windings 30A and 30D, the second phase through stator windings 30B and 30E and the third phase through stator windings 30C and 30F). Alternatively, slip rings or brushes (not shown) may be employed. Referring to FIG. 1, a quadrature magnetic axis 32 (referred to herein as q-axis) and a direct magnetic axis 34 (referred to herein as d-axis) are shown. The first and second permanent magnets 18, 20 aid in the creation of a magnetic field and magnet flux linkage.

Referring to FIG. 1, the propulsion system 10 includes a controller 40 in communication, such as electronic communication, with the electric motor 12. Referring to FIG. 1, the controller 40 may include an online torque estimation module OE and a stored data module SD. The electric motor 12 is configured to generate torque to propel the device 11, for example, through one or more wheels 42. The propulsion system 10 may include a secondary source 44, such as an internal combustion engine, configured to selectively provide a secondary torque contribution to propel the device 11, through the wheels 42, for example.

Figure 5:
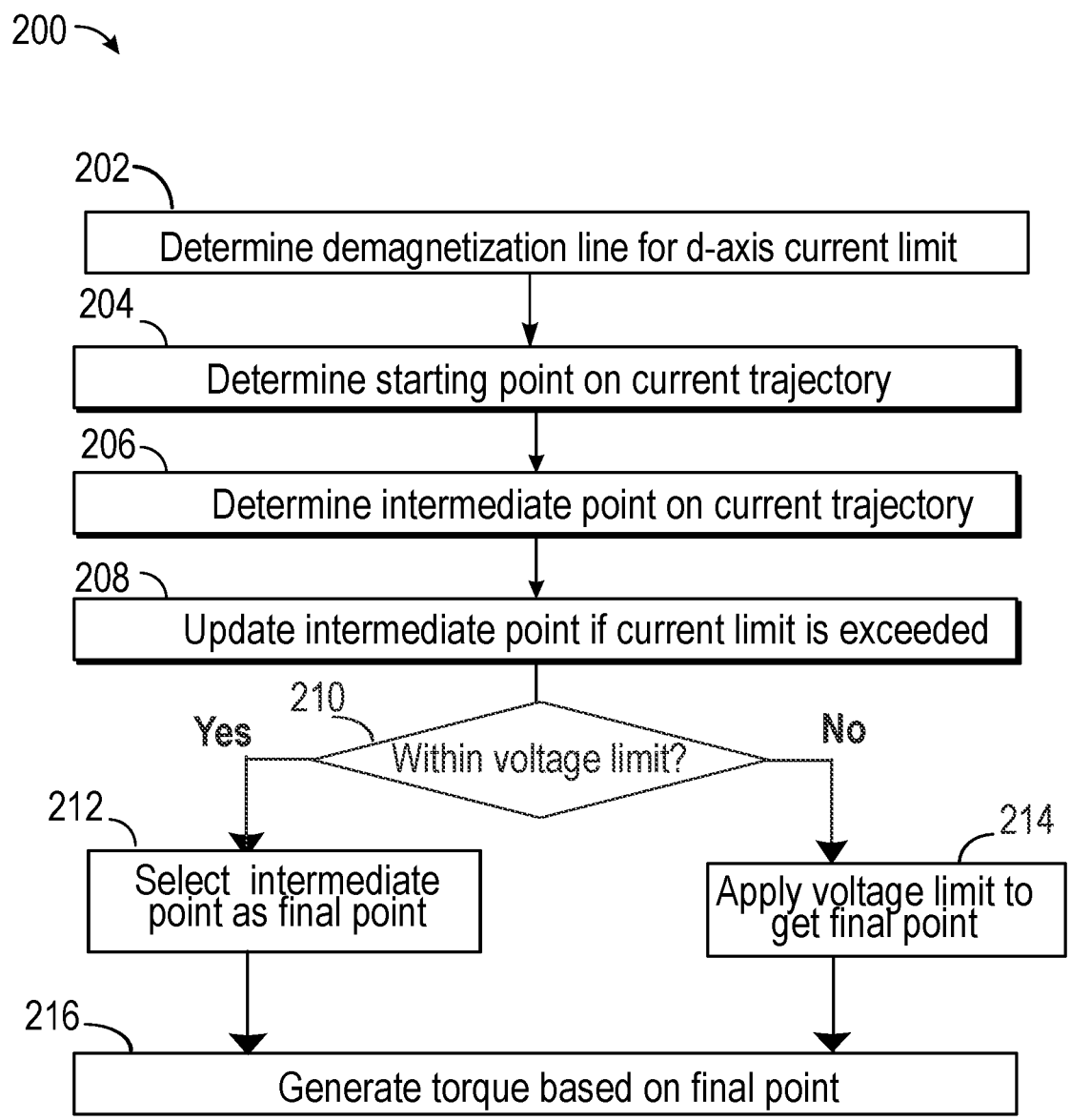
FIG. 5 is a flowchart for a method executable by the controller of FIG. 1.

The controller 40 includes at least one processor P and at least one memory M (or non-transitory, tangible computer readable storage medium) on which are recorded instructions for executing a method 200, shown in FIG. 5, for minimizing demagnetization in the permanent magnets. The memory M can store controller-executable instruction sets, and the processor P can execute the controller-executable instruction sets stored in the memory M.

The permanent magnets in the electric motor 12 may demagnetize over time due to various reasons such as, temperature, age, specific events, thereby affecting the performance of the electric motor 12. As described below, method 200 generates a demagnetized torque capability which satisfies voltage constraints at maximum current. The technical advantage of method 200 is that it maximizes torque generation while minimizing rotor magnet demagnetization. The demagnetized torque capability may be communicated to multiple controllers across the operating space and consumed by the controller 40 to optimize the relative torque contribution from the electric motor 12 and the secondary source 44.

The controller 40 of FIG. 1 is specifically programmed to execute the blocks of the method 200 (as discussed in detail below with respect to FIG. 5) and may receive inputs from one or more sensors. Referring to FIG. 1, the propulsion system 10 may include a stator winding temperature sensor 46, a rotor temperature sensor 48, and a magnet flux linkage observer 50, each capable of measuring a respective physical factor and sending a respective signal to the controller 40. As alternative to physical sensors, virtual software replacements may be used. Additionally, controller 40 may be programmed to determine the respective physical factors by inputting the respective signals into a model or other estimation technique available to those skilled in the art. The propulsion system 10 may include a current sensor 52 that generates a current ripple signal.

Referring to FIG. 1, a direct current (DC) power source 54 is configured to provide a DC link voltage ($V_{dc}$) to the electric motor 12. A pulse width modulated (PWM) inverter 56 may be operatively connected to the controller 40 (and the DC power source 54) and configured to convert DC current to alternating (AC) current.

Referring now to FIG. 5, an example flowchart of the method 200 is shown. Method 200 may be embodied as computer-readable code or instructions stored on and partially executable by the controller C of FIG. 1. Method 200 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 202 of FIG. 5, the method 200 includes determining a threshold d-axis stator current limit based in part on at least one variable motor parameter (e.g., rotor temperature) and other fixed machine design parameters. In one embodiment, the variable motor parameter is the rotor temperature obtained by the rotor temperature sensor 48 and/or a rotor temperature estimator (e.g., as an output of another algorithm). In another embodiment, the variable motor parameter is the current ripple obtained by the current sensor 52. For a particular machine design, the threshold d-axis stator current limit may be obtained through finite element analysis, numerical simulation and other methods available to those skilled in the art.

Figure 2:
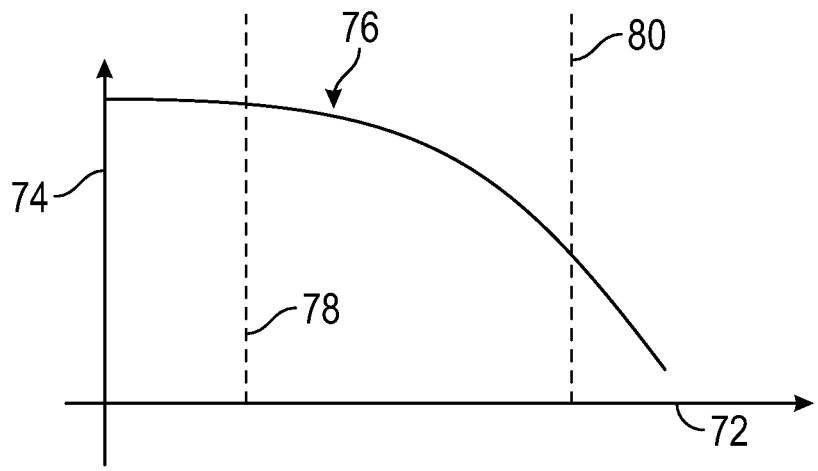
FIG. 2 is a graph showing example stator current limits as a function of temperature for a direct magnetic axis (d-axis)
Figure 3:
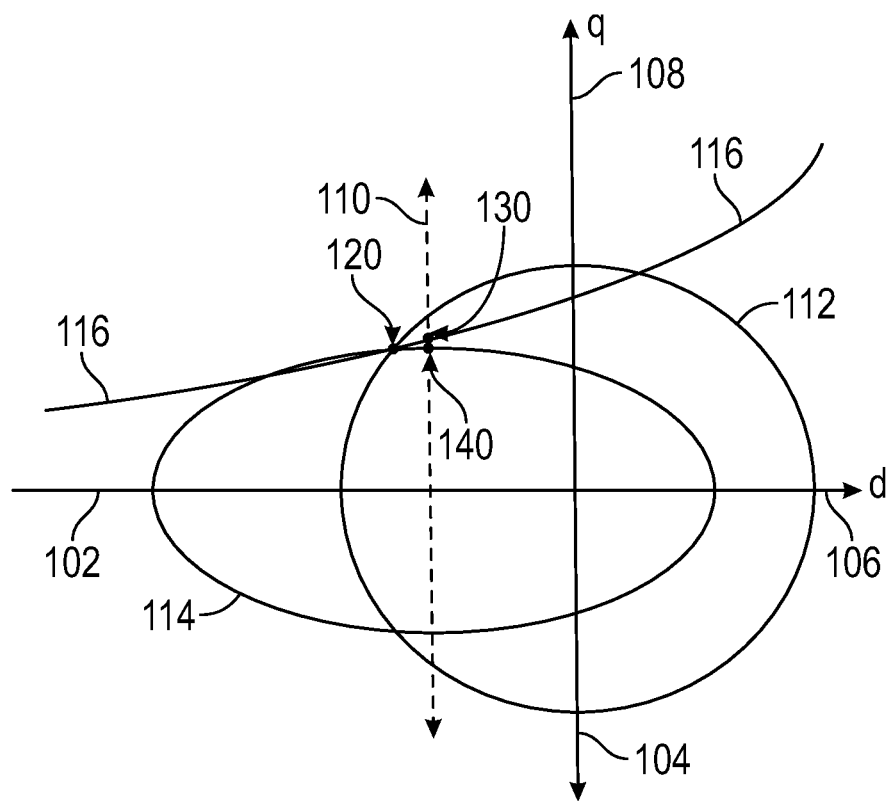
FIG. 3 is a diagram showing an example stator current trajectory relative to a quadrature magnetic axis (q-axis) and a direct magnetic axis (d-axis)

FIG. 2 shows an example trace 76 representing the d-axis stator current limit as a function of rotor temperature. The horizontal axis 72 indicates rotor temperature while the vertical axis 74 indicates the current magnitude. Referring to FIG. 2, the first limit 78 indicates the safe or acceptable d-axis stator current limit at a relatively low temperature and the second limit 80 indicates the acceptable d-axis stator current limit at a relatively high temperature. The threshold d-axis stator current limit may be represented as a demagnetization line 110 in a stator current graph, an example of which is shown in FIG. 3. FIG. 3 shows respective stator current commands in a d-axis and q-axis coordinate system, with a negative d-axis 102, a negative q-axis 104, a positive d-axis 106 and a positive q-axis 108.

Figure 4:
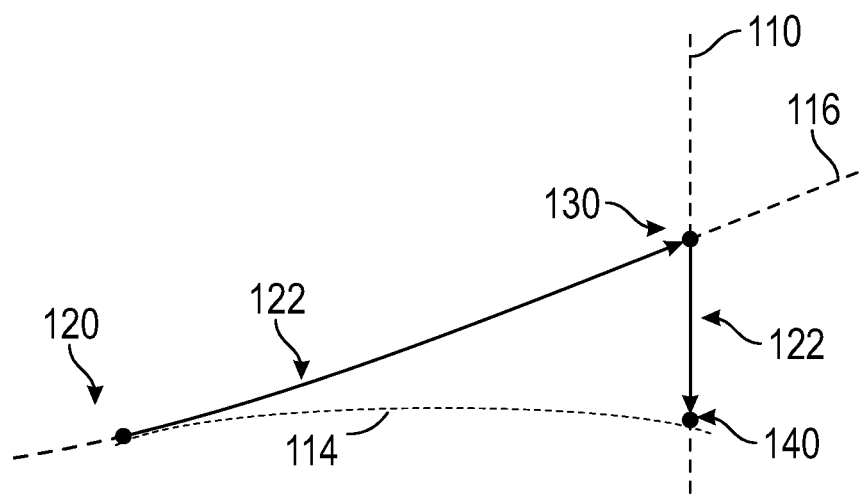
FIG. 4 is an enlargement of a portion of the graph of FIG. 3.

Advancing to block 204 of FIG. 5, the method 200 includes selecting a starting point 120 (see FIGS. 3-4) on a stator current trajectory in a stator current graph (q-axis versus d-axis). FIG. 4 is an enlargement of a portion of the graph of FIG. 3, showing an example stator current trajectory 122. Referring to FIGS. 3-4, the starting point 120 is selected as the intersection of a global current limit 112, a voltage limit ellipse 114, and a desired torque curve 116. The desired torque curve 116 indicates the maximum torque output per ampere that can be provided by the electric motor 12. In other words, the desired torque curve 116 represents a level of torque command that the user/driver would request, employing the lowest current for generating the commanded torque. The starting point 120 in this exemplary embodiment occurs at the maximum system output torque at the intersection of the current limit (represented by the global current limit 112) and voltage limit (represented by the voltage limit ellipse 114). The example trajectory is not limited and applies to each initial operating point with a d-axis current within the global current limit 112 and left of demagnetization line 110 (i.e., larger in magnitude than the demagnetization line 100). This example pertains to motoring operation, however, it is understood that similar principles apply when the drive system is operating in regeneration mode.

The global current limit 112, the voltage limit ellipse 114 and the desired torque curve 116 are obtained as follows. Each point on the global current limit 112 (see FIGS. 3-4) satisfies the equation below: $[i_q^2 + i_d^2 \leq (I_{limit})^2]$ Here, $I_{limit}$ is the maximum allowable stator current, $i_d$ is the respective d-axis stator current and $i_q$ is the respective q-axis stator current. Each point on the desired torque curve 116 satisfies the equation below, where T is the desired torque:

$$T = \frac{3}{2} \frac{P}{2} (\lambda_d * i_q - \lambda_q * i_d).$$

Here, P is the number of pole pairs in the electric motor 12, $i_d$ is the respective d-axis stator current, q is the respective q-axis stator current, $\lambda_d$ is the respective d-axis magnet flux linkage and $\lambda_q$ is the respective q-axis magnet flux linkage. The desired torque (T) is based on a torque command, e.g., based on input from a user of the device 11.

Each point on and within the voltage limit ellipse 114 satisfies the following equation: $(R_s i_d - \omega_r \lambda_q)^2 + (R_s i_q + \omega_r \lambda_d)^2 \leq (V_{s,max})^2$. Here, $V_{s,max}$ is the maximum stator voltage, $R_s$ is the stator resistance, $\omega_r$ is the rotor speed, $i_d$ is the respective d-axis stator current, $i_q$ is the respective q-axis stator current, $\lambda_d$ is the respective d-axis magnet flux linkage and $\lambda_q$ is the respective q-axis magnet flux linkage. The maximum stator voltage may be obtained based in part on the DC link voltage ($V_{dc}$) and a predetermined constant (k), as follows:

$$\left[V_{s,max} = \frac{2}{\pi} k V_{dc}\right].$$

Proceeding to block 206 and referring to FIG. 4, the method 200 includes determining an intermediate point 130 on the stator current trajectory 122 by moving from the starting point 120 along the desired torque curve 116 until the demagnetization line 110 is reached. Proceeding to block 208, the controller 40 is programmed to update intermediate point 130 if the global current limit 112 is exceeded. In other words, the intermediate point 130 is moved along the demagnetization line 110 the global current limit 112 is met.

Advancing to block 210, the controller 40 is programmed to ascertain whether the voltage limit (represented by the voltage limit ellipse 114) is exceeded by the intermediate point 130. If the voltage limit is met by the intermediate point 130 (i.e., the intermediate point 130 is on or inside the voltage limit ellipse 114), the method 200 advances to block 212, where the controller 40 is programmed to select the intermediate point 130 as the final point 140 on the stator current trajectory 122.

If the voltage limit is exceeded by the intermediate point 130 (i.e., the intermediate point 130 is outside the voltage limit ellipse 114), the method 200 proceeds to block 214. Per block 214 and referring to FIG. 4, the controller 40 is programmed to obtain the final point 140 on the stator current trajectory 122 by moving from the intermediate point 130 along the demagnetization line 110 until the voltage limit is met (i.e., the voltage limit ellipse 114 is intersected).

From blocks 212 and 214, the method 200 proceeds to block 216, where the controller 40 is programmed to generate a demagnetized torque capability based on the d-axis and q-axis stator current coordinates of the final point 140. Additionally, per block 214, the controller 40 is configured to control at least one operating parameter of the device 11 based on the demagnetized torque capability. In some embodiments, controlling the operating parameters of the device 11 may include restricting the speed of the device 11 or switching to an alternative operating mode (such as a limp-home mode) based in part on the demagnetized torque capability (e.g., if it is below a minimum level).

As previously noted, the propulsion system 10 may include a secondary source 44 configured to selectively provide a secondary torque contribution to propel the device 11. Controlling the operating parameters of the device 11 may include adjusting the secondary torque contribution from the secondary source 44, based on the magnitude of the demagnetized torque capability and the desired torque demanded by the device 11 (e.g., as indicated by a user of the device 11). For example, if the desired torque is high and the demagnetized torque capability is insufficient to meet it, the controller 40 may increase the secondary torque contribution relative to the torque contribution from the electric motor 12.

In summary, the propulsion system 10 (via execution of method 200) modifies the stator current trajectory in the negative d-axis 102 and positive q-axis 108 to optimize torque performance and prevent demagnetization from occurring. Method 200 adds rotor magnet demagnetization protection which allows the propulsion system 10 to use higher operating currents than otherwise allowed. Furthermore, method 200 improves functioning of the device 11 by enabling the optimization of the relative torque contribution from the electric motor 12 and the secondary source 44 based on the torque capability of the electric motor 12 at a threshold demagnetization level.

The controller 40 of FIG. 1 may be an integral portion of, or a separate module operatively connected to, other controllers of the device 11. The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non- volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowchart shown in the FIGS. illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A propulsion system for a device, comprising:
   an electric motor configured to generate torque to propel the device, the electric motor including a stator and a rotor with one or more permanent magnets;
   a controller in communication with the electric motor and having a processor and tangible, non-transitory memory on which instructions are recorded for a method for minimizing demagnetization in the one or more permanent magnets;
   wherein the controller is adapted to:
      determine a demagnetization line on a stator current graph representing a threshold d-axis stator current, based in part on at least one variable motor parameter;
      select a starting point on a stator current trajectory in the stator current graph;
      obtain an intermediate point on the stator current trajectory by moving from the starting point along a desired torque curve until the demagnetization line is reached;
      obtain a final point on the stator current trajectory based on a comparison of the intermediate point and a predetermined voltage limit; and
      generate a demagnetized torque capability based on the final point on the stator current trajectory.

2. The propulsion system of claim 1, wherein the controller is adapted to control at least one operating parameter of the device based in part on the demagnetized torque capability.

3. The propulsion system of claim 2, further comprising:
   a secondary source configured to selectively provide a secondary torque contribution to propel the device; and
   wherein said controlling at least one operating parameter of the device includes adjusting the secondary torque contribution relative to the torque provided by the electric motor, based on a magnitude of the demagnetized torque capability.

4. The propulsion system of claim 1, wherein:
the starting point intersects a voltage limit ellipse representing the predetermined voltage limit, a global current limit and the desired torque curve; and
the desired torque curve is based in part on torque demand received by the controller and a maximum torque output per unit current for the electric motor.

5. The propulsion system of claim 4, wherein the controller is adapted to select the intermediate point as the final point on the stator current trajectory, when the intermediate point is at or within the predetermined voltage limit.

6. The propulsion system of claim 5, wherein the controller is adapted to determine the final point on the stator current trajectory by moving from the intermediate point along the demagnetization line until the predetermined voltage limit is met, when the intermediate point is outside the predetermined voltage limit.

7. The propulsion system of claim 1, wherein the at least one variable motor parameter is rotor temperature.

8. The propulsion system of claim 1, further comprising:
at least one sensor configured to obtain the at least one variable motor parameter.

9. The propulsion system of claim 8, wherein the at least one variable motor parameter is current ripple and the at least one sensor is a current sensor.

10. The propulsion system of claim 1, further comprising:
a direct current (DC) power source configured to provide a DC link voltage to the electric motor; and
wherein the predetermined voltage limit is based in part on the DC link voltage and a predetermined constant.

11. A method of operating a propulsion system in a device, the propulsion system having an electric motor with a stator and a rotor with one or more permanent magnets, and a controller having a processor and tangible, non-transitory memory, the method comprising:
determining a demagnetization line on a stator current graph representing a threshold d-axis stator current, based in part on at least one variable motor parameter;
selecting a starting point on a stator current trajectory in the stator current graph;
obtaining an intermediate point on the stator current trajectory by moving from the starting point along a desired torque curve until the demagnetization line is reached;
obtaining a final point on the stator current trajectory based on a comparison of the intermediate point and a predetermined voltage limit; and
generating a demagnetized torque capability based on the final point on the stator current trajectory.

12. The method of claim 11, further comprising:
controlling at least one operating parameter of the device based in part on the demagnetized torque capability.

13. The method of claim 11, further comprising:
controlling at least one operating parameter of the device based on a magnitude of the demagnetized torque capability, including increasing a secondary torque contribution provided by a secondary source relative to the torque provided by the electric motor.

14. The method of claim 11, further comprising:
obtaining the starting point as an intersection of a voltage limit ellipse representing the predetermined voltage limit, a global current limit and the desired torque curve, the desired torque curve being based in part on torque demand received by the controller and a maximum torque output per unit current for the electric motor.

15. The method of claim 11, further comprising:
selecting the intermediate point as the final point on the stator current trajectory, when the intermediate point is at or within the predetermined voltage limit.

16. The method of claim 11, further comprising:
determining the final point on the stator current trajectory by moving from the intermediate point along the demagnetization line until the predetermined voltage limit is met, when the intermediate point is outside the predetermined voltage limit.

17. The method of claim 11, further comprising:
obtaining the demagnetization line based in part on a current ripple and/or a rotor temperature.

18. A propulsion system for a device, comprising:
an electric motor configured to generate torque to propel the device, the electric motor including a stator and a rotor with one or more permanent magnets;
a controller in communication with the electric motor and having a processor and tangible, non-transitory memory on which instructions are recorded for a method for minimizing demagnetization in the one or more permanent magnets;
wherein the controller is adapted to:
determine a demagnetization line representing a threshold d-axis stator current, based in part on at least one variable motor parameter;
select a starting point on a stator current trajectory defined by a d- axis stator current command and a q-axis stator current command, the starting point intersecting a voltage limit ellipse representing a predetermined voltage limit, a global current limit and a desired torque curve;
obtain an intermediate point on the stator current trajectory by moving from the starting point along the desired torque curve until the demagnetization line is reached;
when the intermediate point is at or within the predetermined voltage limit, select the intermediate point as a final point on the stator current trajectory;
when the intermediate point is outside the predetermined voltage limit, determine the final point on the stator current trajectory by moving from the intermediate point along the demagnetization line until the predetermined voltage limit is met; and
generate a demagnetized torque capability based on the final point on the stator current trajectory.

19. The propulsion system of claim 18, wherein the controller is adapted to control at least one operating parameter of the device based in part on the demagnetized torque capability.

20. The propulsion system of claim 18, further comprising:
a secondary source configured to selectively provide a secondary torque contribution to propel the device; and
wherein said controlling at least one operating parameter of the device includes adjusting the secondary torque contribution relative to the torque provided by the electric motor, based on a magnitude of the demagnetized torque capability.

* * * * *